No. 801,578. PATENTED OCT. 10, 1905.
B. A. FISKE.
RANGE FINDER.
APPLICATION FILED NOV. 25, 1902.

3 SHEETS—SHEET 1.

Witnesses:
Jas. F. Coleman
Jno. Robt. Taylor

Inventor
Bradley A. Fiske
by Dyer Edmonds & Dyer
Attorneys

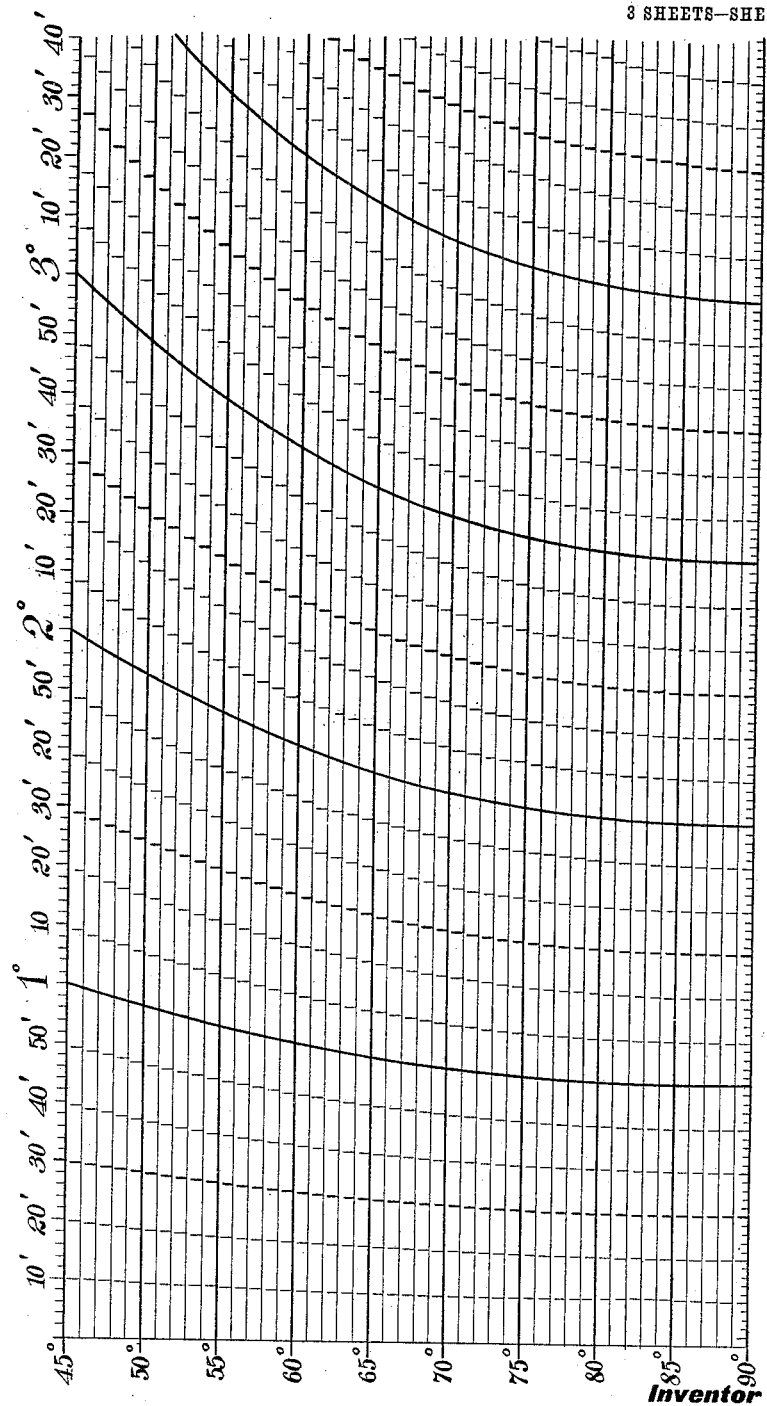

No. 801,578. PATENTED OCT. 10, 1905.
B. A. FISKE.
RANGE FINDER.
APPLICATION FILED NOV. 25 1902.
3 SHEETS—SHEET 3.
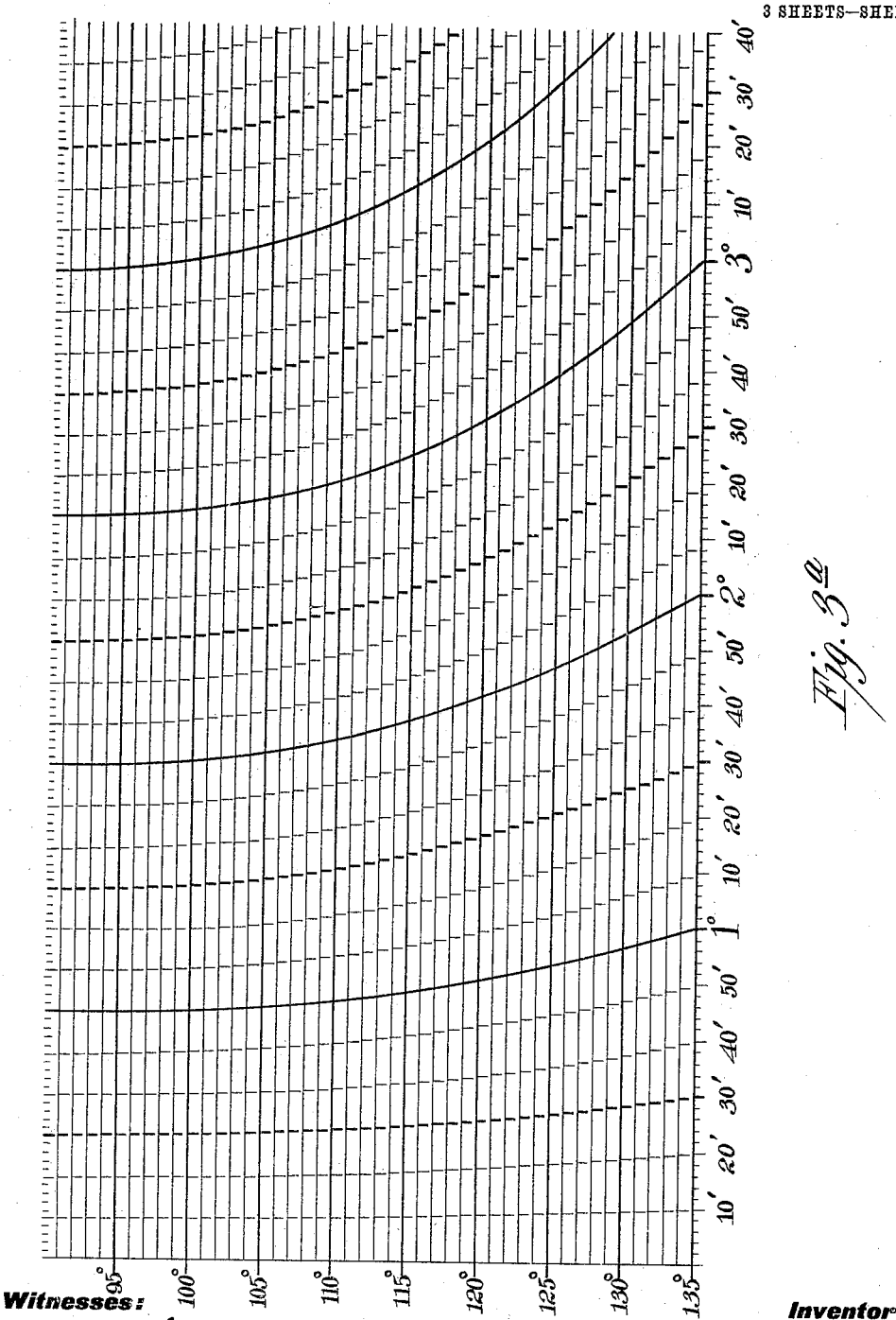
Fig. 3ª
Witnesses: Inventor
Jas. F. Coleman Bradley A. Fiske
Jno. Robt Taylor by Dyer Edmond & Dyer
Attorneys

UNITED STATES PATENT OFFICE.

BRADLEY A. FISKE, OF NEW YORK, N. Y., ASSIGNOR TO WESTERN ELECTRIC COMPANY, OF CHICAGO, ILLINOIS, A CORPORATION OF ILLINOIS.

RANGE-FINDER.

No. 801,578.   Specification of Letters Patent.   Patented Oct. 10, 1905.

Application filed November 25, 1902. Serial No. 132,820.

*To all whom it may concern:*

Be it known that I, BRADLEY A. FISKE, a citizen of the United States, residing in the borough of Manhattan, city of New York, State of New York, have invented a certain new and useful Improvement in Range-Finders, of which the following is a description.

My invention relates to improvements in range-finders adapted particularly for nautical use and of the type employing a known horizontal base-line with respect to which the distance of the target is calculated trigonometrically. My object is to provide a range-finder of this character involving extremely simple apparatus, which is not liable to mechanical derangement, by which the operation of determining the range of the target can be performed quickly and expeditiously, and wherein the calculations are more exact and certain than is the case with purely automatic range-finders as heretofore invented and patented by me.

In carrying my invention into effect on a man-of-war, for example, I employ two telescopes located near the extremities of the vessel and separated by a definite distance to constitute a known base-line. These telescopes coöperate with scales in order that the angle between them and the base-line can be accurately determined. The observers at the two telescopes are connected telephonically with a reader who may be located in the chart-room or other convenient position. The telescopes are directed toward the target—an enemy's war-ship or a hostile fort, for example—and the angle of each telescope to the base-line is then communicated telephonically to the reader. By means of a suitable chart of angles and a properly-graduated rule, with which the reader is supplied, the distance of the target can be immediately determined. The so-called "chart of angles" and its coöperating ruler constitute very simple and convenient means by which the trigonometrical problem can be solved, and they form a very important feature of my invention.

In order that the invention may be better understood, attention is directed to the accompanying drawings, forming part of this specification, and in which—

Figure 1:
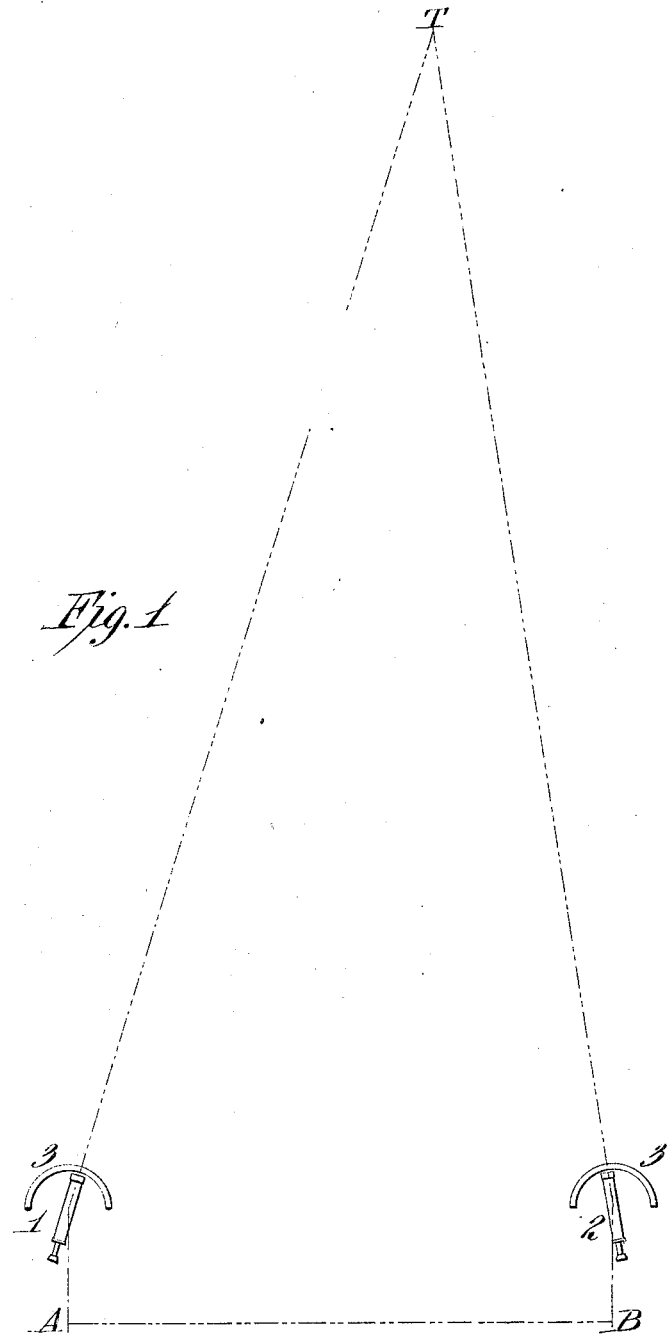
Figure 2:
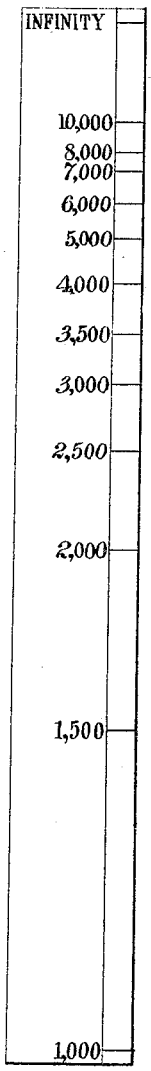

Figure 1 is a diagrammatic view showing the two telescopes at the ends of a known base-line with their coöperating scales and the distant target; Fig. 2, a view illustrating the ruler for coöperation with the chart of angles, and Figs. 3 and 3ª views of the so-called "chart of angles."

Referring to Fig. 1, A B represent a known base-line, and T the target. 1 2 are telescopes mounted at the ends of the base-line A B and coöperating with scales 3 3. These scales are graduated in degrees and minutes of angle from the base-line. Thus if either telescope is directed perpendicular to the base-line a pointer carried thereby indicates ninety degrees on the corresponding scale. If directed at an angle of forty-five degrees from the base-line, its pointer indicates forty-five degrees, &c. The two operators at the telescopes 1 and 2 are, as stated, connected telephonically with a reader located in the chart-house or elsewhere. When it is desired to determine the range of the distant target T, both telescopes are directed thereon and at a given signal a reading of the angle of each telescope is taken. These readings are communicated to the reader by the telephone. Knowing the length of the base-line A B between the pivots of the two telescopes and knowing also the angles, it remains simply to solve the triangle formed by the base-line and the lines running from the ends of the base-line to the target. Thus by trigonometry:

$$A\,T = \frac{A\,B \sin.\,A\,B\,T}{\sin.\,A\,T\,B}$$

and $$B\,T = \frac{A\,B \sin.\,B\,A\,T}{\sin.\,A\,T\,B}.$$

Therefore $$\frac{A\,T + B\,T}{2} = \frac{A\,B}{\sin.\,A\,T\,B} \times \frac{\sin.\,A\,B\,T + \sin.\,B\,A\,T}{2}.$$

By my invention I solve this equation and find the mean of the two distances A T and B T by means of the so-called "chart of angles" illustrated in Figs. 3 and 3ª.

It will be noticed that the middle horizontal line marked "90°" is divided into five equal main parts and that each one of these parts is divided into thirty smaller parts. Each one of the five main parts represents an angle of one degree, and each one of the smaller divisions represents, therefore, an angle of two minutes. All the other horizontal lines are similarly divided; but it will be noted that the divisions are proportionately longer in those lines that are farther away from the middle horizontal line. In other words, divisions on the line marked "45°" are longer than those on the line marked "60°," and these in turn are longer than those on the line marked "90°." The length of each one of these large divisions on any particular line may be thus calculated: Take, for example, the first main division on the forty-five-degree line. The length of this division is equal to the length of the first division on the ninety-degree line divided by the sin. of forty-five degrees plus the sin. of forty-six degrees divided by two. The length of the first division on the forty-six-degree line immediately below it is equal to that of the first division on the ninety-degree line divided by the sin. of forty-six degrees plus the sin. of forty-seven degrees divided by two. Similarly, the length of the first division on the line marked "120°," for example, is equal to that of the first division on the ninety-degree line divided by the sin. of one-hundred and twenty degrees plus the sin. of one hundred and twenty-one degrees divided by two. Take now the second division on any horizontal line. This represents also an angle of one degree between two angles; but each angle is one degree larger than the angles limiting the space to the left of it—that is, the second space on the forty-five-degree line represents from forty-six to forty-seven degrees, while the second space on the one-hundred-and-twenty-degree line represents from one hundred and twenty-one to one hundred and twenty-two degrees, and the length in each case is equal to the length of the first division on the ninety-degree line multiplied by the mean of the sines of these two angles—that is to say, the length of the second division on the forty-five-degree line is equal to the length of the first division on the ninety-degree line multiplied by the sin. of forty-six degrees plus the sin. of forty-seven degrees divided by two, &c. In the same way the third division on any line represents an angle of one degree between two angles; but each angle is one degree greater than the division limiting the space on the left—that is to say, the third division on the forty-five-degree line represents the space between forty-seven and forty-eight degrees, and its length is equal to the first division on the ninety-degree line multiplied by the sin. of forty-seven degrees plus the sin. of forty-eight degrees divided by two, &c.

In Fig. 2 I illustrate a ruler for use in connection with this chart of angles and on which the first graduation is infinity, the other graduations being thus determined: Suppose the base-line to be, say, seventy yards. Now if the target were at such a distance that the angle A T B is one degree and is so close to perpendicular with the base-line that the expression $$\sin. \frac{B\ A\ T + \sin.\ A\ B\ T}{2}$$

is so near to unity that it may be neglected, then the distance $$A\ T + \frac{B\ T}{2}$$

would be $$\frac{A\ B}{\sin.\ A\ T\ B} = \frac{70}{.01745} = 4000,$$

(approximately.) If, now, the distance on this rule from infinity to four thousand (representing yards) equals the distance on the ninety-degree line of one division, then it is plain that if we put the rule on the ninety-degree line with the infinity-mark at the extreme left the indication of four thousand yards will register with the first heavy line. In other words, suppose the angle A B T were ninety degrees and the angle B A T were eighty-nine degrees. Then, the rule being placed on the ninety-degree line so that the infinity-mark registers with ninety degrees, the distance on the ruler representing four thousand yards will correspond to an angle of one degree—i. e., the four-thousand mark will register with the main division at the right. Similarly, if the angle A T B were two degrees then the solution of the equation would make the distance A T one-half of four thousand, or two thousand, (approximately.) Therefore if the two-thousand mark is placed on the rule at twice the distance from the infinity-mark of the four-thousand mark and if the angle A B T were, say, ninety degrees and the angle B A T were eighty-eight degrees then if the ruler is placed on the ninety-degree line with the infinity-mark opposite ninety degrees the distance between the infinity-mark and the indication of two thousand yards will correspond to an angle of two degrees—i. e., the range of two thousand yards will register with the second main line at the right.

We see that this method of graduating the ruler is simply a reciprocal method in which the distance from the infinity or starting mark to any graduation multiplied by that graduation is a constant. Therefore, considering for the moment the case in which the target is so nearly perpendicular to the base-line that the expression $$\frac{\sin.\ A\ B\ T + \sin.\ B\ A\ T}{2}$$

might be neglected, it is evident that if we simply graduate the rule according to this plan and then place the infinity-mark along the ninety-degree line in such a way that it comes opposite the first angle the mark on the rule opposite the second angle will always be the range corresponding to those angles and the base-line. For instance, suppose the first angle is ninety degrees ten minutes and the second angle ninety-one degrees twenty minutes. The distance is found by registering the infinity-mark on the ruler with the graduation on the ninety-degree line representing "90° 10'" and noting the range-mark on the ruler registering with the mark corresponding to ninety-one degrees twenty minutes. We thus see, considering the theory on which this chart is made, that no matter what the angles are it is only necessary to place the ruler on the proper degree-line in such a way that the infinity-mark registers with the first angle and to then note the graduation on the ruler corresponding with the second angle. Thus, if the first angle were forty-five degrees ten minutes and the second angle forty-six degrees thirty minutes it is only necessary to register the infinity-mark with the graduation "45° 10'" and to note the range-mark on the rule registering with the graduation corresponding to forty-six degrees thirty minutes.

It will be understood, of course, that instead of employing a chart, as explained, a long tape might be used marked with the several degrees from forty-five degrees to one hundred and thirty-five degrees (assuming the capacity of the apparatus to be included within these extremes) and by observing on the ruler the range-mark included between the noted angles. Such a tape would, however, be very long and bulky and would therefore be objectionable. For this reason a chart is used.

Since the degree-marks on the forty-five-degree line are, as stated, longer than the corresponding degree-marks on the ninety-degree line, it is not possible with a chart of a convenient rectangular form to include all the degree-marks on any line except the ninety-degree line. For this reason I make use of horizontal lines corresponding to the intermediate degrees. Thus the line immediately under the forty-five-degree line represents forty-six degrees, the next line forty-seven degrees, the next line forty-eight degrees, and so on. If, therefore, the first angle is forty-six degrees and the second angle forty-seven degrees, the ruler may be used on the forty-five-degree line with the infinity-mark on the first main division representing forty-six degrees and the range observed at the next main degree-line, or the rule may be placed on the forty-six-degree line with the infinity-mark at the extreme left and the reading on the scale be observed at the next main degree-line at the right.

Having now described my invention, what I claim as new therein, and desire to secure by Letters Patent, is as follows:

1. A chart for use with range-finders, having a plurality of parallel division-lines with curved crossing lines dividing the division-lines into spaces each representative of a certain angular difference between two angles divided by the mean of the sines of those angles, substantially as set forth.

2. A chart for use with range-finders, having a plurality of parallel division-lines with curved crossing lines dividing the division-lines into spaces each representative of a certain angular difference between two angles divided by the mean of the sines of those angles, and a ruler having range-marks thereon coöperating with said chart, substantially as set forth.

This specification signed and witnessed this 25th day of October, 1902.

BRADLEY A. FISKE.

Witnesses:
 FRANK L. DYER,
 JNO. ROBT. TAYLOR.